(12) United States Patent
Arnold

(10) Patent No.: US 6,599,087 B2
(45) Date of Patent: Jul. 29, 2003

(54) ACTUATOR SHAFT SEAL FOR VARIABLE NOZZLE TURBOCHARGER

(75) Inventor: Steven Don Arnold, Ranchos Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/056,267

(22) Filed: Jan. 25, 2002

(65) Prior Publication Data

US 2002/0098080 A1 Jul. 25, 2002

Related U.S. Application Data

(60) Provisional application No. 60/264,202, filed on Jan. 25, 2001.

(51) Int. Cl.$^7$ ............................................... F01D 17/16
(52) U.S. Cl. ........................ 415/163; 415/204; 415/206
(58) Field of Search .................................. 415/159, 160, 415/163, 204, 206, 230

(56) References Cited

U.S. PATENT DOCUMENTS 4,679,984 A * 7/1987 Swihart et al. ............. 415/163
4,804,316 A * 2/1989 Fleury .......................... 417/407
6,210,106 B1 * 4/2001 Hawkins ...................... 415/160

* cited by examiner

Primary Examiner—Ninh H. Nguyen
(74) Attorney, Agent, or Firm—Ephraim Starr.

(57) ABSTRACT

A shaft seal for use with a unison ring actuator crank is disposed within a center or bearing housing of a variable nozzle turbocharger to reduce leakage of hot exhaust gas from an adjacent turbine housing. A seal ring is disposed within the turbine housing backing plate which has two differently sized diameter sections. The seal ring is positioned within a relatively larger diameter opening section and has an inside diameter sized to permit independent rotation around the shaft and an outside diameter sized to cover a relatively smaller diameter opening section. A relieved back surface directed towards the center housing such as a conical back surface that is tapered axially inwardly moving radially from the outside diameter to the inside diameter of the seal ring provides the desired sealing while not adding to the operating friction of the crank.

3 Claims, 2 Drawing Sheets

ACTUATOR SHAFT SEAL FOR VARIABLE NOZZLE TURBOCHARGER

CROSS-REFERENCE TO RELATED APPLICATIONS

This application claims priority of the Provisional Application serial No. 60/264,202 of the same title filed on Jan. 25, 2001.

FIELD OF THE INVENTION

This invention relates generally to the field of variable geometry turbochargers and, more particularly, to shaft seal design for use with a unison ring actuator crank disposed within a center or bearing housing of a variable nozzle turbocharger to reduce leakage of hot exhaust gas from an adjacent turbine housing while not adding to the operating friction of the crank.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft and housed in a compressor housing. Thus, rotary action of the turbine also causes the air compressor to spin within a compressor housing of the turbocharger that is separate from the turbine housing. The spinning action of the air compressor causes intake air to enter the compressor housing and be pressurized or boosted a desired amount before it is mixed with fuel and combusted within the engine combustion chamber.

In a turbocharger it is often desirable to control the flow of exhaust gas to the turbine to improve the efficiency or operational range of the turbocharger. Variable geometry turbochargers have been configured to address this need. A type of such variable geometry turbocharger is one having a variable exhaust nozzle, referred to as a variable nozzle turbocharger. Different configurations of variable nozzles have been employed in variable nozzle turbochargers to control the exhaust gas flow. One approach taken to achieve exhaust gas flow control in such variable nozzle turbochargers involves the use of multiple pivoting vanes that are positioned annularly around the turbine inlet. The pivoting vanes are commonly controlled by a unison ring and actuator crank to alter the throat area of the passages between the vanes, thereby functioning to control the exhaust gas flow into the turbine.

In order to ensure the proper and reliable operation of such variable nozzle turbochargers, it is important that any leakage of exhaust gas from the turbine housing be minimized and that the plurality of vanes be controlled in a manner that is without impairment, e.g., by friction or otherwise. Variable nozzle turbochargers, such as that disclosed in U.S. patent application Ser. No. 09/408,694 entitled VARIABLE GEOMETRY TURBOCHARGER having a common assignee with the present application, comprise an actuator crank having a shaft that is disposed through the center or bearing housing, and that includes one shaft end disposed within the turbine housing and attached to the unison ring, and an opposite shaft end that is disposed within the center housing and attached to a hydraulic actuating mechanism. The Shaft is rotatably supported within an opening through the center housing by one or more bushings.

The center housing actuator crank shaft opening is subjected to different turbocharger operating different temperatures depending on location within the center housing. For example, a portion of the opening disposed within the center housing away from the turbine housing is exposed to an operating temperature that is similar to that of the lubricating oil routed through the center housing for lubricating the turbine shaft. A portion of the opening positioned adjacent the turbine housing, e.g., forming a wall of the turbine housing in function, is exposed to the relatively higher temperature exhaust gas that is directed into and passed through the turbine housing. This temperature differential within the actuator crank shaft opening is know to produce a considerable thermal growth differential that could cause the shaft to rub or otherwise bind up in the center housing, thereby impairing efficient and dependable actuator crank actuation.

Conventional variable nozzle turbochargers have been designed to address this issue of differential thermal growth of the actuator crank shaft opening by designing the portion of the opening within the wall adjacent the turbine housing to have an oversized or enlarged diameter hole. The enlarged diameter hole is oversized to account for the thermal growth related radial displacement of the center housing wall section, thereby avoiding potential binding or otherwise impairing interference with the actuator crank shaft. While the use of an oversized opening hole through the center housing wall may act to address the issue potential actuator crank shaft impairment by thermal growth, it produces a large leak path for the potential passage of exhaust gas from the turbine housing.

In order to address this leak path, conventional variable nozzle turbochargers include a sealing system that has an effect of imposing unwanted friction on the actuator crank shaft. Typical oil actuation systems for actuating the actuator crank functions with a wide variation in pressure. Many engines have only five psi of oil pressure at ideal conditions. Therefore, it is important that the amount of friction imposed on the vane actuation system be kept at a minimum to permit movement with very low actuation forces. The frictional forces imposed by sealing systems of conventional variable nozzle turbochargers can impair vane actuation.

It is, therefore, desirable that a variable nozzle turbocharger be constructed having an actuator shaft seal that is configured in a manner that facilitates actuation of the actuator crank and related unison ring and multiple vanes via low actuation forces without unwanted friction, thereby providing improved vane actuation reliability when compared to conventional variable nozzle turbocharger designs. It is further desired that such actuator shaft seal be constructed in a manner that does not produce an undesired amount of gas leakage from the turbine housing.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

A variable geometry or variable nozzle turbocharger generally comprises a center housing having a turbine housing attached at one end, and a compressor housing attached at an opposite end. A shaft is rotatably disposed within a bearing assembly contained within the center housing. A turbine or turbine wheel is attached to one shaft end and is disposed within the turbine housing, and a compressor impeller is attached to an opposite shaft end and is disposed within the compressor housing. The turbine and compressor housings are attached to the center housing by bolts that extend between the adjacent housings.

Figure 1:
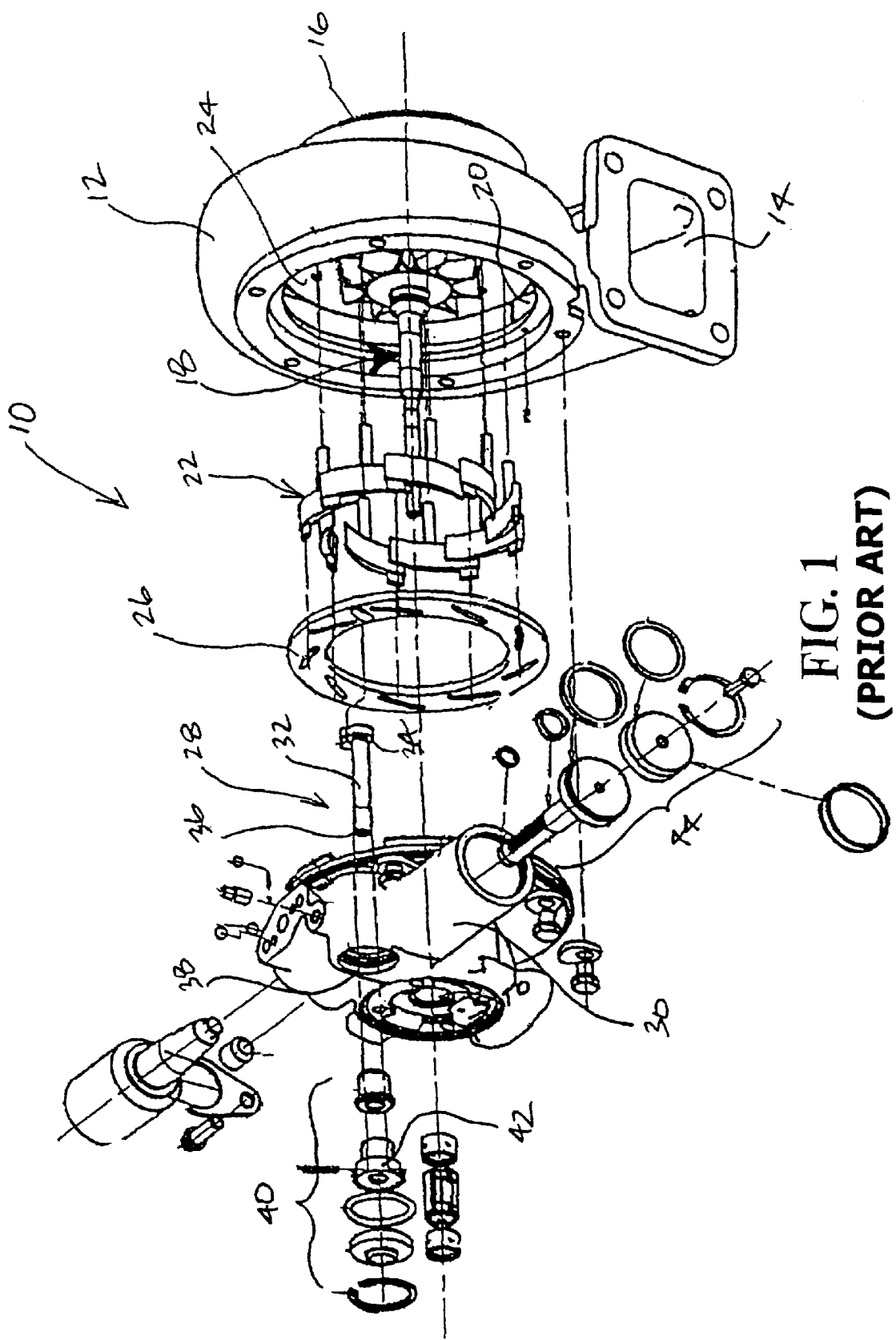
FIG. 1 is a perspective partial view of a known variable nozzle turbocharger.

FIG. 1 illustrates a portion of a known variable nozzle turbocharger 10 comprising a turbine housing 12 having a standard inlet 14 for receiving an exhaust gas stream, and an outlet 16 for directing exhaust gas to the exhaust system of the engine. A volute is connected to the exhaust inlet and an integral outer nozzle wall is incorporated in the turbine housing casting adjacent the volute. A turbine wheel and shaft assembly 18 is carried within the turbine housing. Exhaust gas, or other high energy gas supplying the turbocharger, enters the turbine through the inlet and is distributed through the volute in the turbine housing for substantially radial entry into the turbine wheel through a circumferential nozzle entry 20.

Multiple vanes 22 are mounted to a nozzle wall 24 machined into the turbine housing using shafts that project perpendicularly outwardly from the vanes and that are rotationally engaged within respective openings in the nozzle wall. The vanes each include actuation tabs that project from a side opposite the shafts and that are engaged by respective slots in a unison ring 26, which acts as a second nozzle wall.

An actuator assembly 28 is disposed within a turbocharger center or bearing housing 30 and generally comprises an actuator shaft 32, means for rotatably retaining the shaft within the center housing, and means for rotating or actuating the shaft within the center housing. The actuator shaft 32 includes a first axial end 34 that is attached to a crank arm and that is connected with the unison ring 26. The shaft first end projects outwardly a distance from a wall of the center housing that functionally forms a wall of the turbine housing. The actuator shaft includes an opposite second axial end 36 that is disposed within an opening 38 through the center housing, and that is carried therein by a bearing and seal assembly. A gear 42 is attached to the shaft second axial end 34 for purposes of rotatably operating the shaft by a hydraulic actuating means 44. Examples of known variable nozzle turbochargers comprising such elements are disclosed in U.S. Pat. Nos. 4,679,984 and 4,804,316, which are both incorporated herein by reference.

The actuator shaft is thus disposed within an opening through the center housing that is subjected to different thermal conditions. Namely, the portion of the opening adjacent the shaft second axial end 34 is subjected to the relatively lower operating temperature associated with the lubricating oil running through the main casting portion of the center housing to lubricate the turbine shaft and shaft bearings, while the opening or hole adjacent the shaft first axial end 32 is positioned within the turbine housing back plate that is subjected to the relatively greater operating temperature associated with the exhaust gas directed into the turbine housing.

To accommodate the differential thermal growth that occurs within the shaft opening, for purposes of minimizing shaft frictional interference within the opening, the opening hole through the turbine housing backing plate adjacent the shaft first axial end is oversized. However, this oversized opening potentially creates a large exhaust gas leak path into the center housing that must be addressed by a shaft seal assembly. In such known turbocharger construction, two shaft seals are used to provide a sequential stepped or overlapping seal coverage to accommodate thermally induced expansion and contraction movements, and yet maintain some desired degree of sealing. This type of sealing arrangement, however, imposes friction onto the actuator shaft which can impair the efficient actuation movement of the shaft by the hydraulic actuating means.

Figure 2:
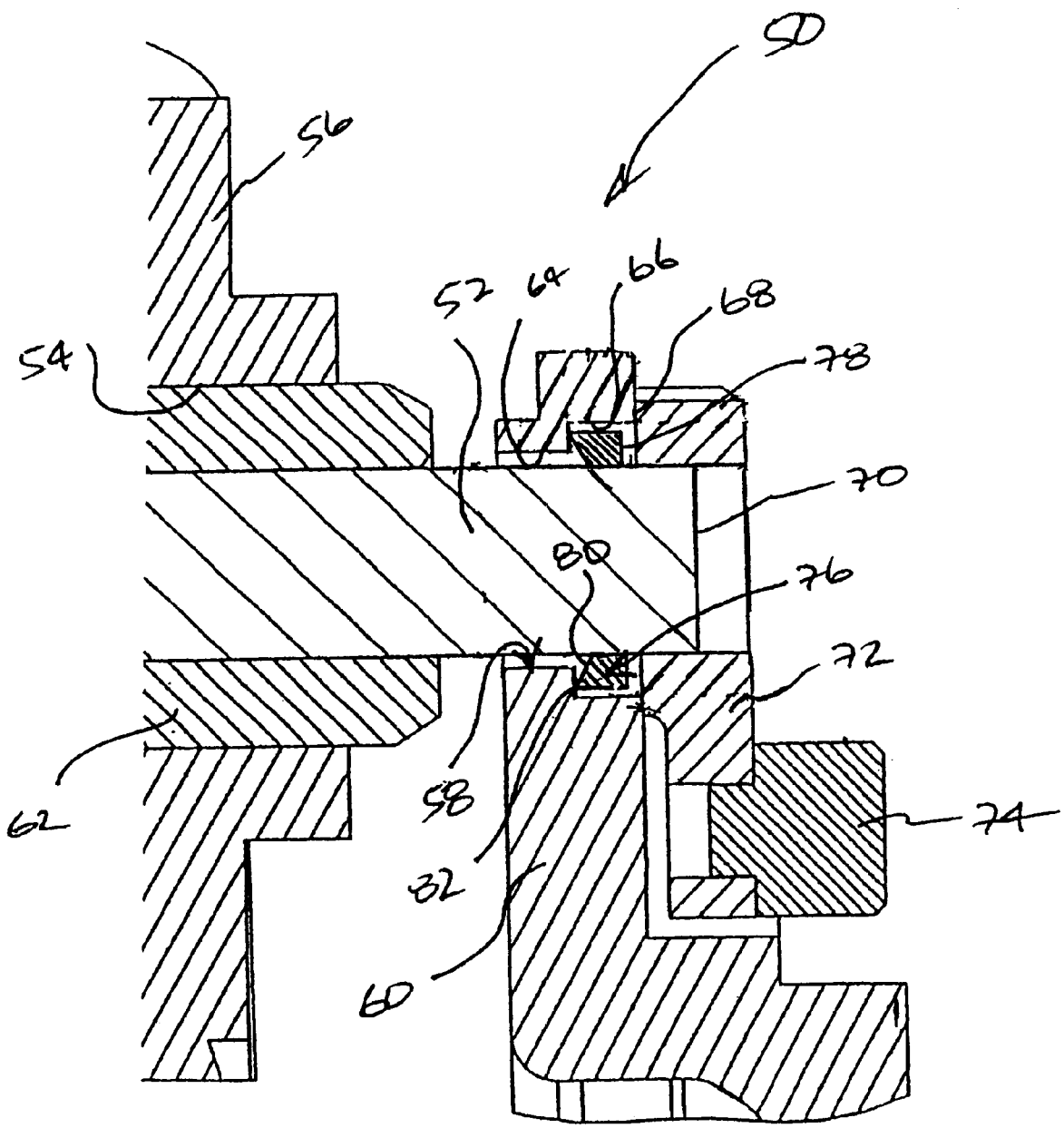
FIG. 2 is a cross-sectional partial side view of an actuator shaft and seal assembly constructed according to the principles of this invention.

FIG. 2 illustrates an actuator shaft and seal assembly 50, constructed according to principles of this invention. An actuator shaft 52 is received through an opening 54 through the center housing main casting portion 56, and further received through an opening 58 through a turbine housing flange plate 60. The shaft 52 is rotatably held within the opening 52 by a bushing 62, and is sealed and retained within the opening 52 by conventional sealing and retaining mean. A gear (not shown) is attached to an axial end of the shaft disposed within the opening 54 and is in gear tooth communication with a conventional hydraulic actuation means (not shown) disposed within the center housing. The shaft is therefore retained, sealed and actuated within the opening 54 in the same manner as recited above for the known turbocharger construction.

Moving from left to right across FIG. 2, the shaft has a substantially continuous diameter as it projects outwardly from the bushing 62 and into the turbine housing flange plate opening 58. The opening 58 includes a first diameter section 64 that extends axially a distance into the opening 58, and a second diameter section 66 that extends axially from the first diameter section 64 to an end 68 of the opening 58. The second diameter section 66 is sized having an enlarged diameter when compared to the first diameter section. An axial end 70 of the shaft 52 projects outwardly a distance from the end 68 of the opening and is attached to a lever arm 72. The lever arm 72 includes a pin 74 that is configured to engage a slot in the unison ring (see FIG. 1) for purposes of moving the ring.

A principle feature the actuator shaft and seal assembly of this invention involves the manner in which the shaft 52 is sealed within the opening 58 through the turbine housing backing plate 60. A single annular seal ring 76 is disposed around the shaft and is positioned within the opening second diameter section 66. The seal 76 can be formed from the same types of materials conventional used to provide a sealing function under conditions of extreme temperatures, e.g., metal. The seal ring is sized having an inside diameter that permits its free rotation around the shaft 52, and having an outside diameter that is sufficiently large to cover the opening first diameter section 64 under all thermal gradient conditions.

The seal ring 76 includes a front surface 78 (facing towards the lever arm 72) that is parallel with the opening end 68, and that is perpendicular to the shaft. The seal ring includes a back surface 80 (facing towards the bushing 62) that is relieved, either by the use of a conical shape or by used of a simple counterbore. In an example embodiment, as illustrated in FIG. 2, the seal ring back surface is angled radially inwardly, moving from the seal outside diameter to the seal inside diameter, and provides a single circular contact point 82 against an opposed axial surface of the opening second diameter section 66.

The seal ring back surface is configured in this manner, i.e., is relieved, to enable the back surface of the seal ring to vent to atmospheric pressure while the front surface of the seal ring is pressurized by the turbine housing inlet pressure. The pressure differential imposed between the seal front and back surfaces causes the sealing ring to be moved into sealing contact against the axial surface of the opening second diameter section 66, thereby providing a self energizing sealing function. As the operating pressure within the turbine housing increases, so too does the differential pressure imposed on the seal ring and the sealing contact between the seal and the opening 66.

The seal ring 76 works in conjunction with an interference seal, that is formed between opposing surfaces of the lever arm 72 and the end 68 of the opening 58, to provide a sufficiently leak resistant seal between the shaft and the opening 58 through the turbine housing backing plate 60. A feature of this sealing system is that is provides such desired level of sealing capability during all thermal gradient conditions and without imposing an undesired frictional force on the shaft, which could impair efficient shaft actuation.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A variable geometry turbocharger assembly comprising:

a turbine housing having an inlet for exhaust gas and an outlet, a volute connected to the inlet, and an integral outer nozzle wall adjacent the volute;

a turbine wheel carried within the turbine housing and attached to a shaft;

a center housing connected at one of its ends to the turbine wheel and including a bearing assembly disposed therein for rotatably carrying the shaft;

a turbine housing flange plate interposed between the center housing and turbine housing;

a plurality of vanes disposed within the turbine housing;

an annular unison ring positioned axially adjacent the vanes, the unison ring having a plurality of slots that each accommodate a respective tab therein; and an actuator shaft disposed within the center housing and turbine housing backing plate for causing rotation of the unison ring, the actuator shaft including a seal ring disposed therearound and positioned within the turbine housing backing plate, the seal ring having a relieved back surface directed towards the center housing.

2. The variable geometry turbocharger assembly as defined in claim 1 wherein the seal ring is disposed within an opening through the turbine housing backing plate having two differently sized diameter sections, wherein the seal ring is positioned within a relatively larger diameter opening section, the seal ring having an inside diameter sized to permit independent rotation around the shaft, and having an outside diameter sized to cover a relatively smaller diameter opening section.

3. The variable geometry turbocharger assembly as defined in claim 1 wherein the relieved back surface of the seal ring comprises a conical back surface that is tapered axially inwardly moving radially from a seal ring outside diameter to a seal ring inside diameter.

* * * * *